US010572618B2

(12) United States Patent
Beck et al.

(10) Patent No.: US 10,572,618 B2
(45) Date of Patent: Feb. 25, 2020

(54) ENABLING AUTOMATIC STAGING FOR NETS OR NET GROUPS WITH VHDL ATTRIBUTES

(71) Applicant: INTERNATIONAL BUSINESS MACHINES CORPORATION, Armonk, NY (US)

(72) Inventors: Manuel Beck, Kirchheimunter (DE); Florian Braun, Leinfelden-Echterdingen (DE); Lukas Dällenbach, Altdorf (DE); Heinz Josef Hemmes, Weil im Schoenbuch (DE); Marvin von der Ehe, Herrenberg (DE)

(73) Assignee: International Business Machines Corporation, Armonk, NY (US)

(*) Notice: Subject to any disclaimer, the term of this patent is extended or adjusted under 35 U.S.C. 154(b) by 150 days.

(21) Appl. No.: 15/823,622

(22) Filed: Nov. 28, 2017

(65) Prior Publication Data
US 2019/0163854 A1 May 30, 2019

(51) Int. Cl.
*G06F 17/50* (2006.01)
(52) U.S. Cl.
CPC ...... *G06F 17/5045* (2013.01); *G06F 17/5072* (2013.01); *G06F 2217/06* (2013.01); *G06F 2217/84* (2013.01)
(58) Field of Classification Search
CPC ............. G06F 17/5045; G06F 17/5072; G06F 2217/06; G06F 2217/84
See application file for complete search history.

(56) References Cited

U.S. PATENT DOCUMENTS

| 7,921,398 | B2 | 4/2011 | Curtin et al. |
|---|---|---|---|
| 8,141,019 | B2 | 3/2012 | Curtin et al. |
| 8,667,441 | B2 | 3/2014 | Alpert et al. |
| 8,769,470 | B2 | 7/2014 | Dai et al. |
| 8,881,089 | B1 | 11/2014 | Alpert et al. |
| 8,954,912 | B2 | 2/2015 | Alpert et al. |
| 9,092,591 | B2 | 7/2015 | Alpert et al. |
| 9,141,740 | B2 | 9/2015 | Liu et al. |

(Continued)

OTHER PUBLICATIONS

Cho et al., "LatchPlanner: Latch Placement Algorithm for Datapath-oriented High-Performance VLSI Designs," International Conference on Computer-Aided Design (ICCAD), 2013 IEEE/ACM, Nov. 18-21, 2013, San Jose, CA, USA, Copyright 2013 IEEE, pp. 342-348.

(Continued)

*Primary Examiner* — Nha T Nguyen
(74) *Attorney, Agent, or Firm* — Reza Sarbakhsh

(57) ABSTRACT

There is provided a computer implemented method for processing a formal specification of a digital circuit. The specification comprises information about a signal path for forwarding a digital signal from a source to a sink. The method comprises inputting the formal specification; identifying at least one signal group and at least one signal path belonging to the signal group based on the formal specification; inputting physical design constraints; and calculating, based on the physical design constraints and the at least one signal group, a number of clocked stages to be inserted into the signal path, such that the signal paths of a certain signal group have the same calculated number of clocked stages.

17 Claims, 7 Drawing Sheets

(56) References Cited

U.S. PATENT DOCUMENTS

| | | | |
|---|---|---|---|
| 9,171,112 B2 | 10/2015 | Kalpat et al. | |
| 2011/0320992 A1 | 12/2011 | Alpert et al. | |
| 2015/0121319 A1* | 4/2015 | Hutton | G06F 17/505 |
| | | | 716/101 |
| 2017/0068769 A1* | 3/2017 | Singh | G06F 17/5081 |

OTHER PUBLICATIONS

Li, et al., "Fast Interconnect Synthesis with Layer Assignment," Proceedings of the 2008 International Symposium on Physical Design, ISPD '08, Apr. 13-16, 2008, Portland, Oregon, USA, Copyright 2008, ACM, pp. 71-77.

Teng et al., "Latch-Based Performance Optimization for Field-Programmable Gate Arrays," IEEE Transactions on Computer-Aided Design of Integrated Circuits and Systems, vol. 32, No. 5, May 2013, pp. 667-680.

* cited by examiner

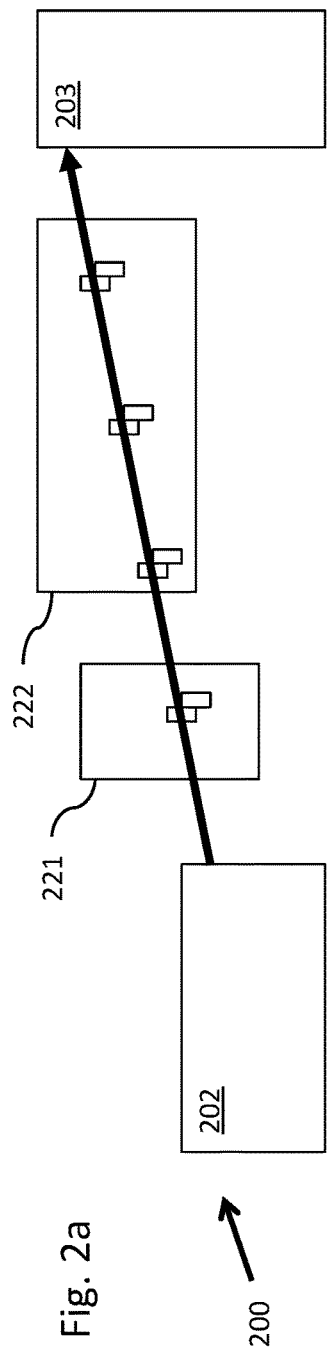
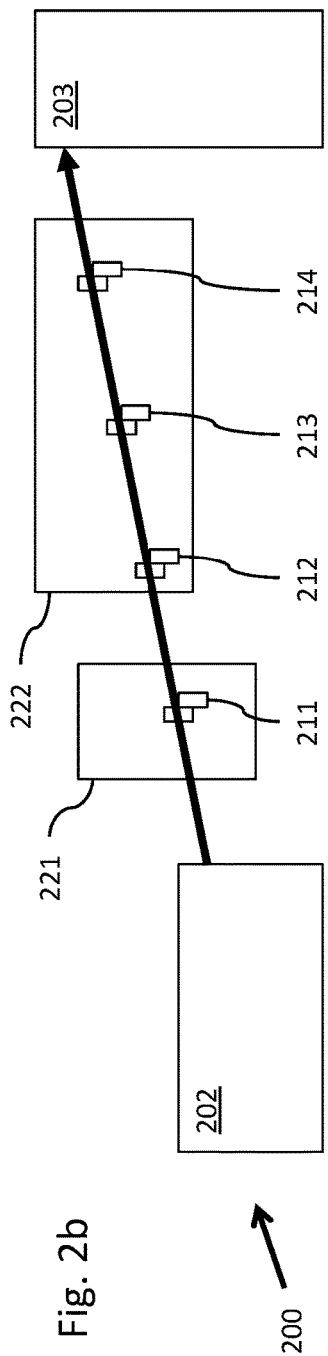
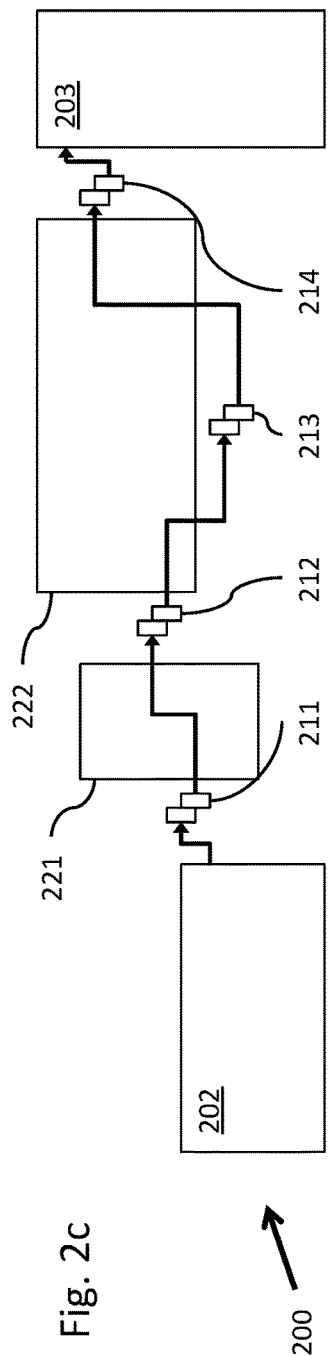

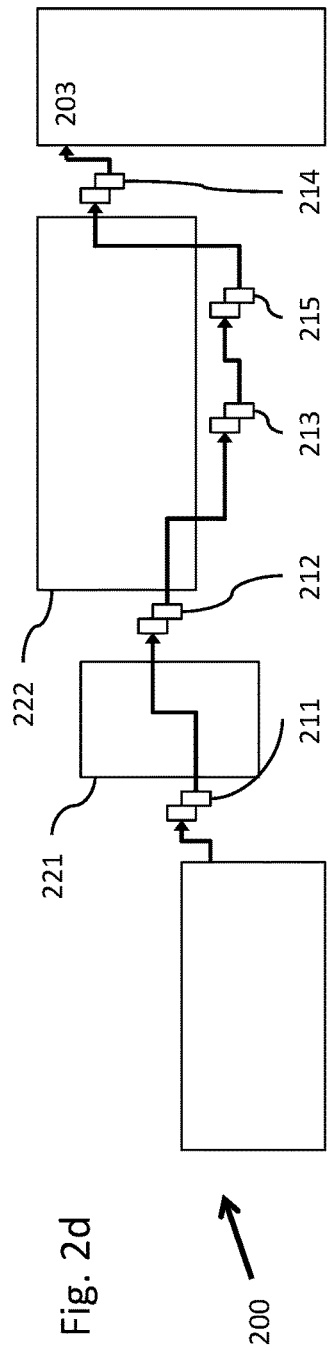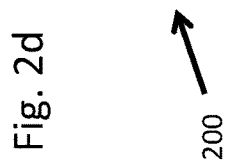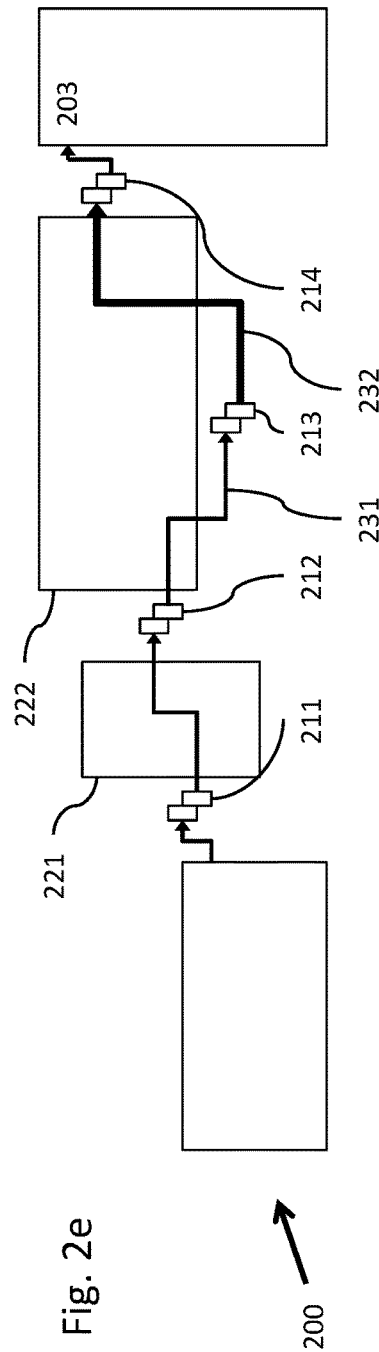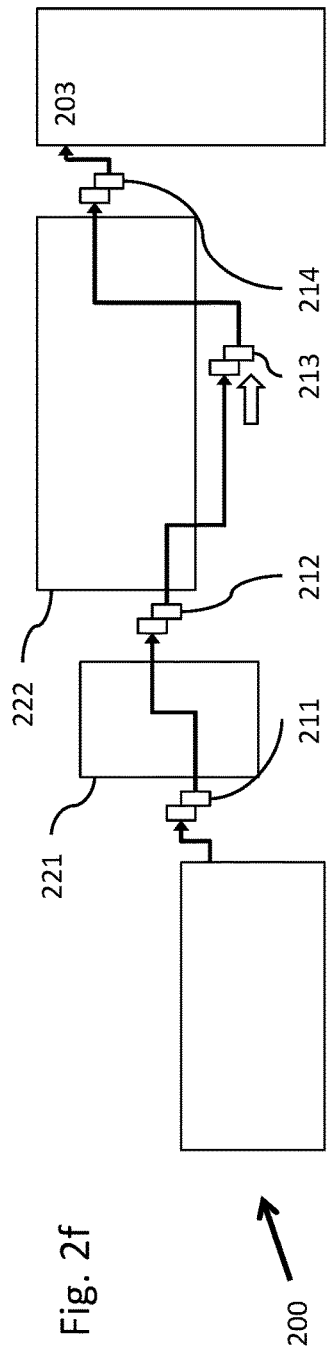

US 10,572,618 B2

ENABLING AUTOMATIC STAGING FOR NETS OR NET GROUPS WITH VHDL ATTRIBUTES

BACKGROUND

The current disclosure relates to a computer implemented method for processing a formal specification of a digital circuit and a computer program product comprising a computer readable storage medium having computer readable program code embodied therewith, wherein the computer readable program code is executable by a processor to perform the method.

Large digital circuits may comprise several sub-circuits which may have to exchange data with one another. The sub-circuits may have a predefined physical layout and may be formed at certain positions of a semi-conductor device. A digital signal may have to be forwarded from one sub-circuit called source to another sub-circuit called sink along a signal path. Routing signal paths from the source to the sink may require a lot of manual interaction in the design process.

Hence, there may be a need for a computer implemented method for processing a formal specification of a digital circuit, wherein the specification comprises information about a signal path for forwarding a digital signal from a source to a sink.

SUMMARY

Shortcomings of the prior art are overcome and additional advantages are provided through the provision of a computer implemented and a computer program product according to the independent claims. Advantageous embodiments are described in the dependent claims.

According to a first aspect, there is provided a computer implemented method for processing a formal specification of a digital circuit. The specification comprises information about a signal path for forwarding a digital signal from a source to a sink. The method comprises inputting the formal specification; identifying at least one signal group and at least one signal path belonging to the signal group based on the formal specification; inputting physical design constraints; and calculating, based on the physical design constraints and the at least one signal group, a number of clocked stages to be inserted into the signal path, such that the signal paths of a certain signal group have the same calculated number of clocked stages.

In an embodiment, the method comprises identifying a minimum number of clocked stages of a signal group from the formal specification, wherein the calculated number of clocked stages is greater than or equal to the minimum number.

According to another embodiment, the method comprises identifying a maximum number of clocked stages of a signal group from the formal specification, wherein the calculated number of clocked stages is less than or equal to the maximum number.

Further, an embodiment prescribes that the formal specification includes a hardware description language file and at least one of the following is identified based on analyzing an attribute contained in the hardware description language file: the at least one signal group, the minimum number of clocked stages or the maximum number of clocked stages.

In another embodiment, the physical design constraints comprise at least one of: restrictions of uselayers allowed for routing the signal path, restriction on a wirecode allowed for routing the signal path, or floor planning data specifying at least one region where a restriction related to the uselayer or the wirecode apply.

Further, an embodiment prescribes that the method comprises calculating pre-positions of the clocked stages which have equal distance.

According to an additional embodiment, the clocked stage comprises at least one of a latch, a pulsed latch or a register.

According to a second aspect, there is provided a computer program product comprising a computer readable storage medium having computer readable program code embodied therewith, wherein the computer readable program code is executable by a processor to perform at least one of the methods described hereinbefore.

Additional features and advantages are realized through the techniques disclosed herein. Other embodiments and aspects of the invention are described in detail herein and are considered a part of the claimed aspects.

BRIEF DESCRIPTION OF THE SEVERAL VIEWS OF THE DRAWINGS

One or more aspects of the present invention are particularly pointed out and distinctly claimed as examples in the claims at the conclusion of the specification. The foregoing and other objects, features, and advantages of the invention are apparent through the following detailed description taken in conjunction with the accompanying drawings in which:

FIG. 2a-f show exemplary digital circuits;

DETAILED DESCRIPTION

Figure 1A:
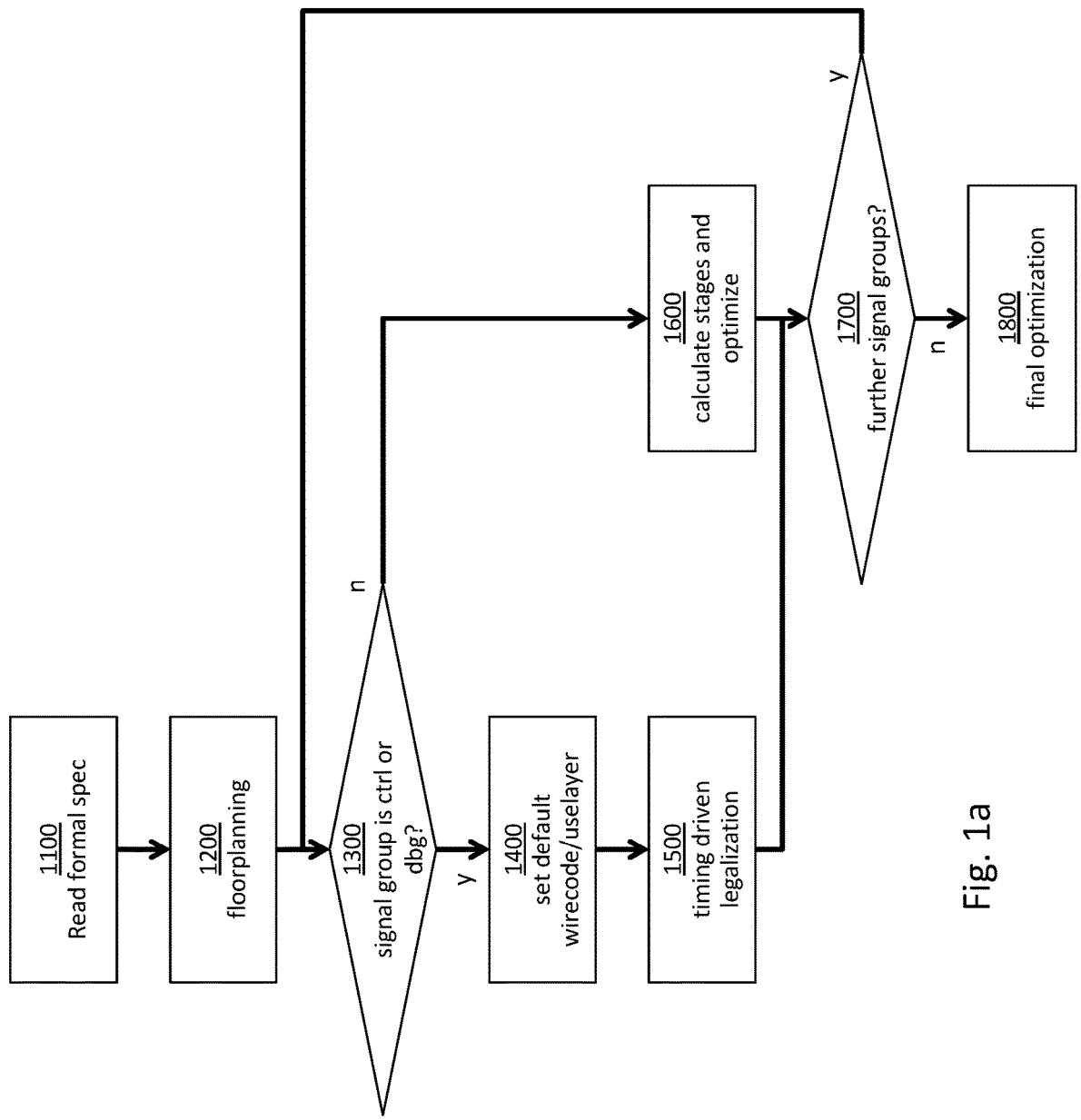
FIG. 1a-c show a flow chart for illustrating an embodiment of a method for processing a formal specification of a digital circuit.
Figure 1B:
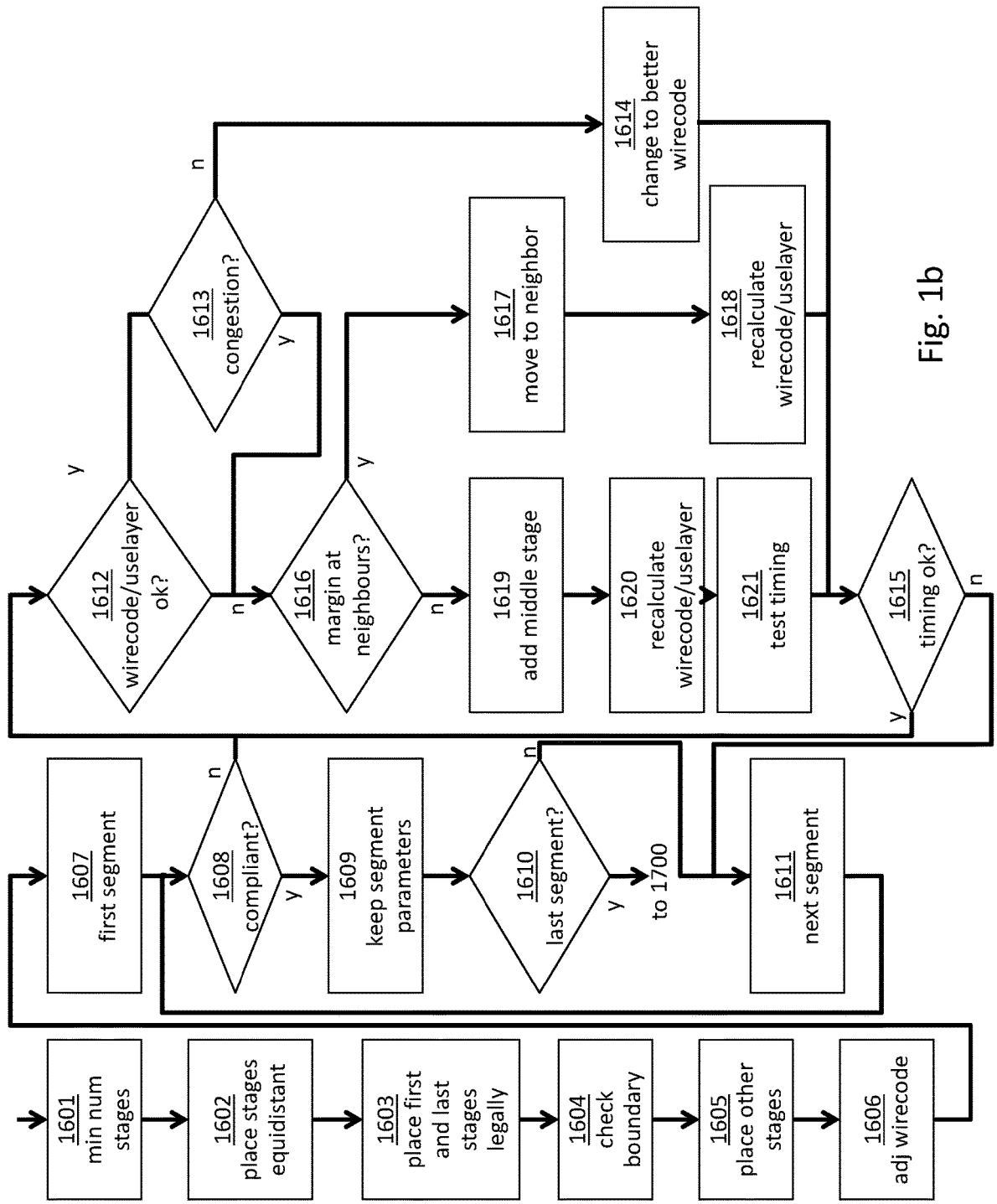
Figure 1C:
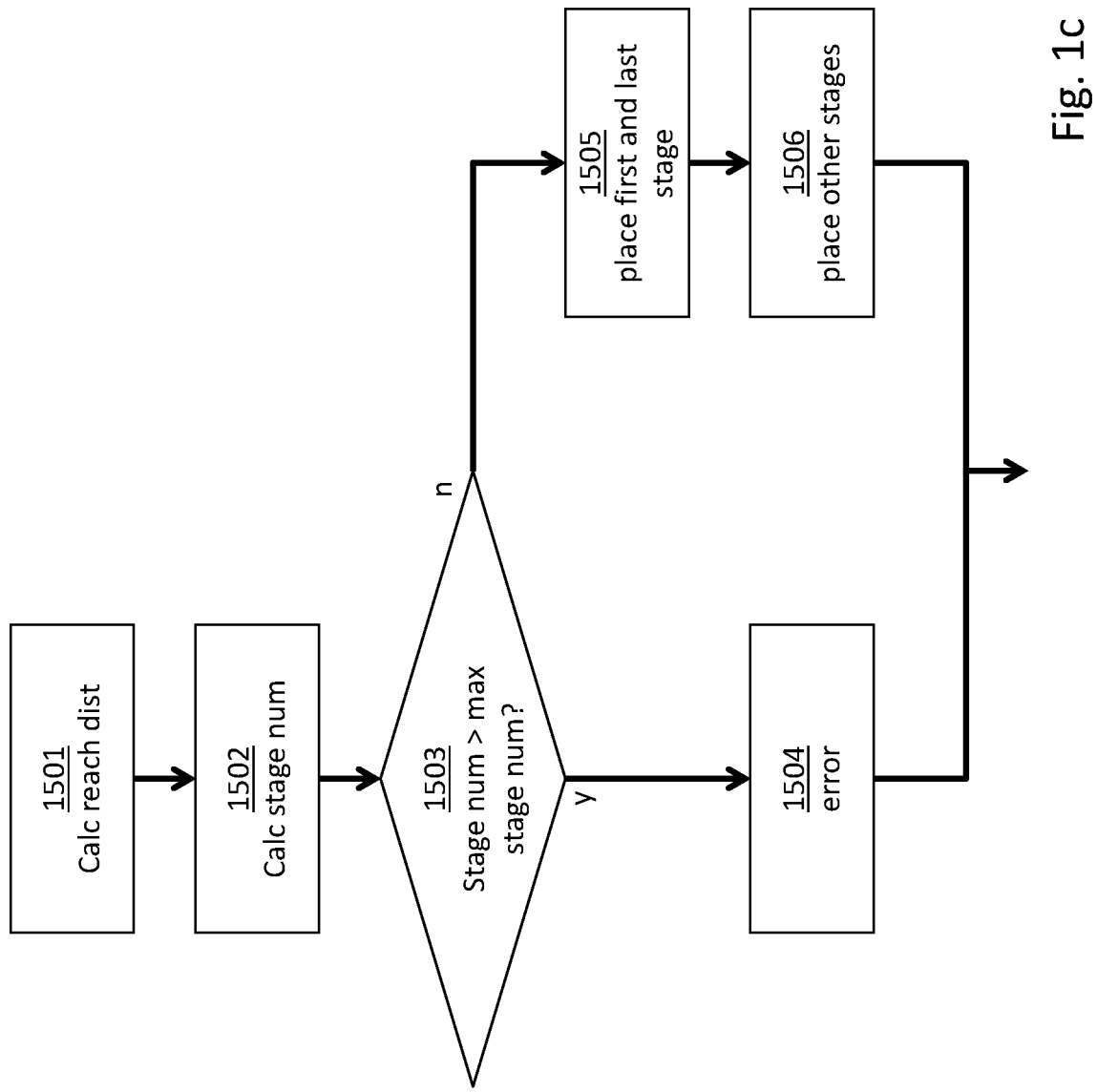

FIGS. 1a to 1c show a flow chart for illustrating an embodiment of a method for processing a formal specification of a digital circuit. The formal specification may be given in Very High Speed Integrated Circuit Hardware Description Language ((VHSIC Hardware Description Language, VHDL).

In a first step 1100, the method prescribes reading a formal specification to identify different sub-circuits of the digital circuit. In a second step 1200, floorplanning takes place. Different sub-circuits of the digital circuit are placed and will typically form larger blocks, which may be optimized individually. For example, sub-circuits providing memory functions may be placed as blocks, which allows for increasing the density of memory cells compared to individually placing the memory cells. Typically, the larger blocks will have to exchange data with one another via signal paths.

Hence, in a further step 1300, the method provides identifying a first signal group and at least one signal path based on the formal specification, which comprises information about a signal path for forwarding a digital signal from one block called source to another block called sink. Furthermore, it is determined if the signal group relates to control or debug signals. If not, the method continues with step 1600 for calculating the number of clocked stages to be included in the signal path(s) and the physical parameters of the signal paths. Step 1600 will be explained in greater detail with reference to FIG. 1b.

If the signal group relates to control or debug signals, step 1400 prescribes setting a default and maximum wirecode as well as a default uselayer for the signal group based on information derived from the formal specification of the digital circuit. The wirecode may refer to the dimensions and materials used for an electrical connection between the blocks and the uselayer to the position of a signal path or a segment of the signal path within the several layers constituting the semiconductor device.

Afterwards, the clocked stages are placed according to the given wirecode and a predetermined maximum number of clocked stages (step 1500) as will be explained in greater detail with reference to FIG. 1c.

Then, in response to an analysis of the formal specification for further signal groups (step 1700), the method either restarts with step 1300 for the next signal group or the placement of all clocked stages gets an additional optimization based on clock domains and the density of clocked stages within a certain area of the digital circuit (step 1800).

FIG. 1b illustrates step 1600 of FIG. 1a in greater detail. In a first sub-step 1601, a predetermined minimum number of clocked stages is provided. In a following sub-step 1602, the clocked stages are placed with equal distance to one another along the signal path from the source to the sink. Thereafter, the first clocked stage after the source and the last clocked stage before the sink are placed at a legal position according to a timing analysis (sub-step 1603). Further, boundary conditions are checked (sub-step 1604). Afterwards, in sub-step 1605, the remaining clocked stages are placed at a legal position and the wirecode in each segment of the signal path is adjusted to ensure that forwarded digital signals arrive in time at the receiving clocked stage (sub-step 1606). Afterwards, the segments of the signal path get optimized. Starting with the first segment of the signal path (sub-step 1607), it is tested if the digital signal forwarded via said segment arrives in time, i.e. has a positive slack, if the selected wirecode and uselayer is available in the area of the segment and if no congestion of clocked stages is to be found in the area of the segment (sub-step 1608). If all conditions are fulfilled, the parameters for the segment remain unchanged (sub-step 1609) and it is determined if the analyzed segment is the last of the current signal path (sub-step 1610). If yes, the method continues with step 1700 shown in FIG. 1a. If not, optimizing continues with the next segment (sub-step 1611).

If not all conditions tested for in sub-step 1608 are fulfiled, it is determined if at least the wirecode and the uselayer for the segment are allowed in sub-step 1612. If this is the case, it is tested if the congestion in the area of the segment is not too high (sub-step 1613). If the congestion is ok, the method prescribes using a better wirecode for the segment (sub-step 1614) and it is tested if the timing of the segment afterwards complies with the requirements (sub-step 1615). If this is the case, the method continues with the sub-step 1611, i.e. the next segment of the signal path. If not, further optimization of the segment is performed by re-starting at sub-step 1612.

In case it is determined that the wirecode and the uselayer for the segment are not allowed (sub-step 1612) or the congestion in the area of the segment does not comply with the requirements (sub-step 1613), it is determined if there are margins for improvement at neighbouring segments (sub-step 1616). If this is the case, the clocked stage of the analyzed segment is moved closer to a neighbouring clocked stage as much as possible without risking a correct timing of the neighbouring segment in a legal position (sub-step 1617) and a new wirecode and uselayer are calculated for the current segment (sub-step 1618) before retesting the timing of the segment takes place (sub-step 1615). If sub-step 1616 results in a negative answer, an additional clocked stage is provided in the middle of the current segment (sub-step 1619), the new clocked stage is moved to a legal position (sub-step 1620) and the wirecode/uselayer for the two new partial segments gets recalculated (sub-step 1621), before retesting of the timing requirements (sub-step 1615) takes place.

FIG. 1c shows step 1500 of FIG. 1a in greater detail. In a first sub-step 1501 the reach distance between two clocked stages is calculated based on the given maximum wirecode and uselayer derived in step 1400 of FIG. 1a. The reach distance may be considered as the maximum distance which is allowed between two clocked stages to comply with timing requirements.

In the next sub-step 1502, the necessary number of clocked stages required for the distance between the source and the sink of the signal path is calculated based on the reach distance of a one clocked stage. If a comparison (step 1530) shows that the necessary number of clocked stages calculated in sub-step 1502 surpasses the prescribed maximum number of clocked stages determined in step 1400, an error results (1504) and the step 1500 ends.

If not, the first clocked stage after the source and the last clocked stage before the sink are placed in a permissible position taking into account timing and load results (sub-step 1505). Afterwards, the further clocked stages are placed equidistant on a legal position (sub-step 1506).

FIGS. 2a to 2h illustrate an embodiment of a computer implemented method for processing a formal specification of a digital circuit 200. The digital circuit 200 comprises a source 202 and a sink 203, which are to be connected via a signal path 201 for forwarding a digital signal from the source 202 to the sink 203. The signal path 201 may belong to a signal group. Based on physical design constraints, a minimum number of clocked stages 211, 212, 213, 214 to be inserted in the signal path 201 may be calculated.

In a first step shown in FIG. 2b, the minimum number of clocked stages 211, 212, 213, 214 may be inserted in the signal path 211 such that the clocked stages 211, 212, 213, 214 have equal distance.

Based on a default wirecode the timing between the clocked stages 211, 212, 213, 214 may be calculated. A wirecode may refer to the dimensions and materials used for an electrical connection between elements of the digital circuit 200, in particular for electrical connections between the clocked stages 211, 212, 213, 214 and/or the source 202 and/or the sink 203.

In response to the calculated timing, the first stage 211 after the source and the last stage 214 before the sink are positioned under consideration of floorplanning data to a legal and timing clean position.

Figure 4:
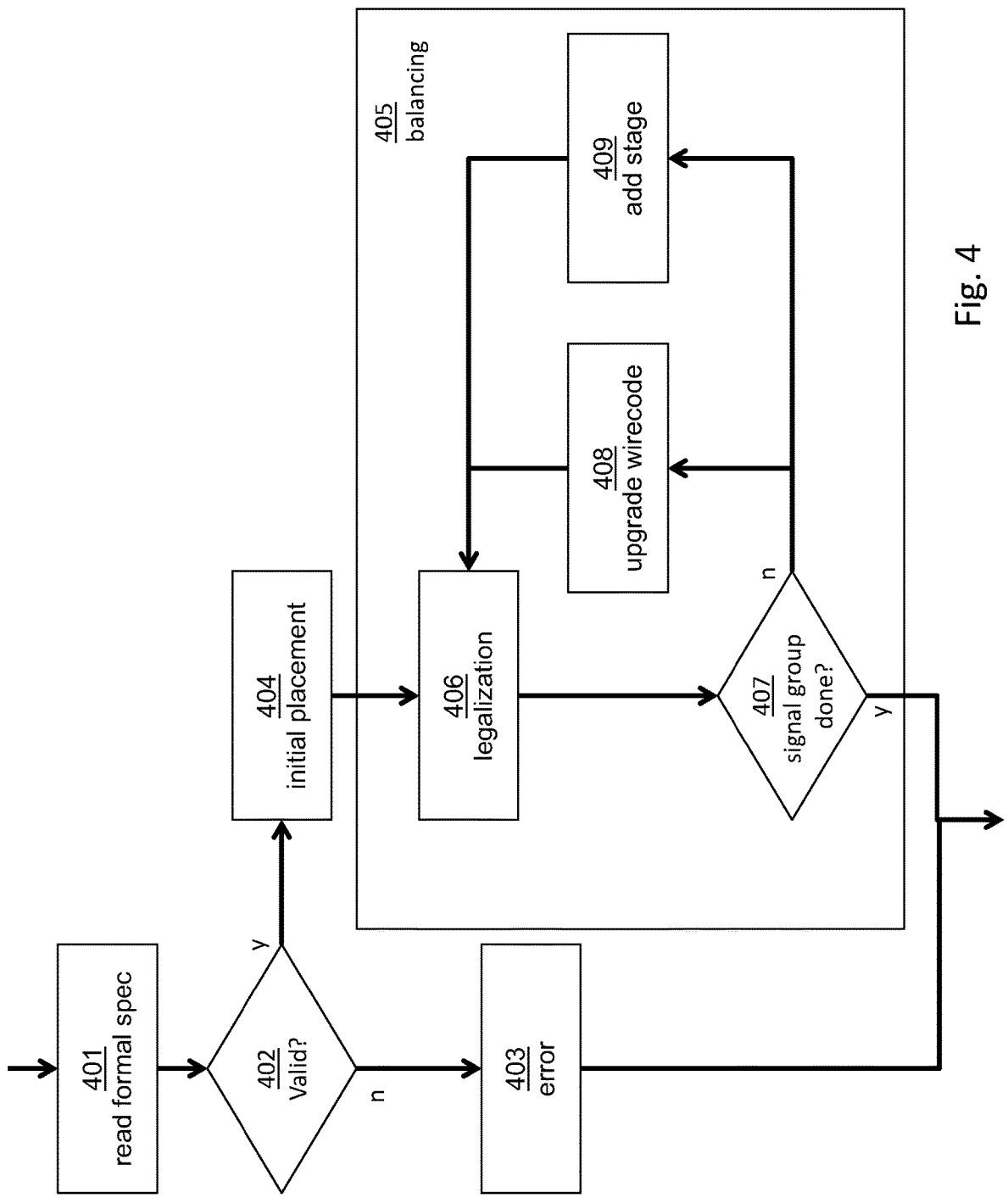
FIG. 4 shows a flow chart for illustrating another embodiment of a method for processing a formal specification of a digital circuit.

FIG. 4 illustrates a more general example of a computer implemented method for processing a formal specification of a digital circuit. For each signal group comprising at least one signal path, the method prescribes reading the formal specification and identifying physical design constraints associated with said signal group (step 401). The physical design constraints may include a prescribed a maximum number of clocked stages to be introduced in the signal path and/or a maximum wirecode to be used for the segment path. Based on the physical design constraints, the method prescribes validating (step 402). Validating may include verifying if the physical design constraints make it impossible to find a solution at all. For example, the sink may be too far away from the source for the given maximum number of clocked stages and/or maximum wirecode. In this case, the method may prescribes outputting an error message (step 403).

If finding a solution seems possible, an initial placement of a minimum number of clocked stages is performed (step 404). The first clocked stage after the source and the last clocked stage before the sink are placed in a legal position based on timing requirements. Afterwards, the clocked stages inbetween are placed with equal distance to each other and the wirecode is calculated based on the length of each segment.

In a further step 405, the clocked stages may be balanced to optimize the transmissions of digital signals via the signal path. Balancing may start with moving the clocked stages such that digital signals arrive at every clocked stage in time and such that the clocked stages are placed in a legal position (step 406). If it is determined in step 407 that the timing is not ok for at least one segment in view of the current wirecode, the method may prescribe upgrading the wirecode (step 408) and/or adding a further clocked stage (step 409). Afterwards, the clocked stages may be moved again (step 406). After the positions and the wirecodes of the clocked stages of a certain signal group have been optimized, the method may continue with the next signal group. In case it is not possible that the digital signals arrive in time for every segment of the signal path, balancing may include ensuring that all segments fail to comply with the timing requirement by the same time difference or that all but one segment comply with the timing requirement and only one segment does not comply with the timing requirement.

According to a further aspect, a computer program product is provided, the computer program product being programmed for executing a method described herein when executed on a programmable computer. The computer program product may include a storage medium for storing the program, such as semiconductor storage (Flash, RAM, etc.) or magnetic or optical mass storage devices (optical discs, hard discs, etc.).

An exemplary embodiment of a computing environment which may implement one or more aspects of the present invention is described below with reference to FIG. 3.

Figure 3:
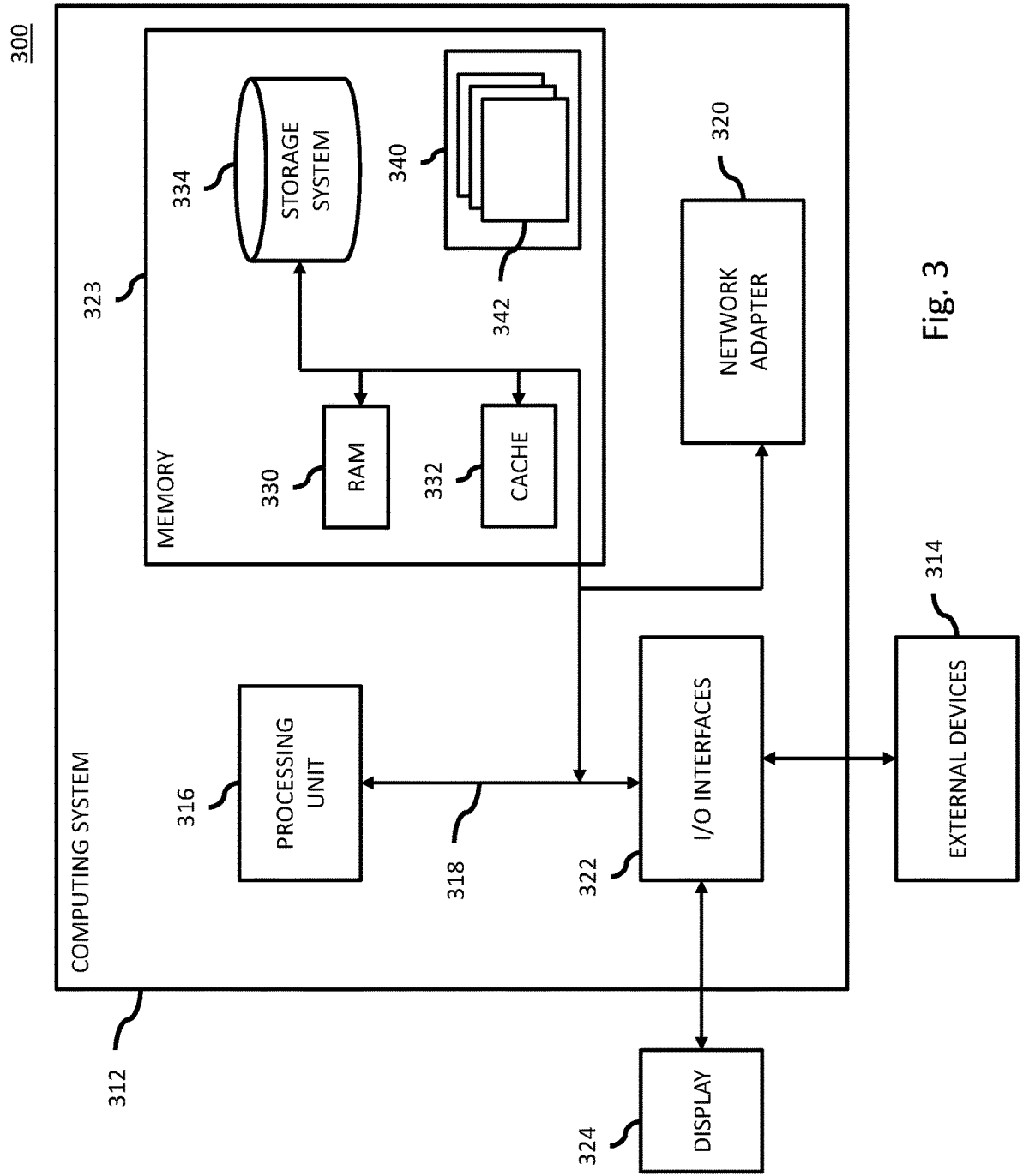
FIG. 3 depicts one embodiment of a computing system which may implement or facilitate implementing the method for processing a formal specification of a digital circuit.

By way of example, FIG. 3 depicts one embodiment of a computing environment 300, which includes a computing system 312. Examples of well-known computing systems, environments, and/or configurations that may be suitable for use with computer system 312 include, but are not limited to, a server, a desktop computer, a work station, a wireless computer, a handheld or laptop computer or device, a mobile phone, a programmable consumer electronic device, a tablet, a personal digital assistant (PDA), and the like.

Computing system 312 may be described in the general context of computer system-executable instructions, such as program modules, being executed by a computer system. Generally, program modules may include routines, programs, objects, components, logic, data structures, and so on that perform particular tasks or implement particular abstract data types.

As depicted in FIG. 3, computing system 312, is shown in the form of a general-purpose computing device. The components of computing system 312 may include, but are not limited to, one or more processors or processing units 316, a system memory 323, and a bus 318 that couples various system components including system memory 323 to processor 316.

In one embodiment, processor 316 may be based on the z/Architecture® offered by International Business Machines Corporation, or other architectures offered by International Business Machines Corporation or other companies. z/Architecture® is a registered trademark of International Business Machines Corporation, Armonk, N.Y., USA. One embodiment of the z/Architecture® is described in "z/Architecture® Principles of Operation," IBM Publication No. SA22-7832-10, March 2015, which is hereby incorporated herein by reference in its entirety.

In other examples, it may be based on other architectures, such as the Power Architecture offered by International Business Machines Corporation. One embodiment of the Power Architecture is described in "Power ISA™ Version 2.07B," International Business Machines Corporation, Apr. 9, 2015, which is hereby incorporated herein by reference in its entirety. POWER ARCHITECTURE is a registered trademark of International Business Machines Corporation, Armonk, N.Y., USA. Other names used herein may be registered trademarks, trademarks, or product names of International Business Machines Corporation or other companies.

Bus 318 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing system 312 may include a variety of computer system readable media. Such media may be any available media that is accessible by computing system 312, and it includes both volatile and non-volatile media, removable and non-removable media.

System memory 323 can include computer system readable media in the form of volatile memory, such as random access memory (RAM) 330 and/or cache memory 332. Computing system 312 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media could be provided. In such instances, each can be connected to bus 318 by one or more data media interfaces. As described below, memory 323 may include at least one program product having a set (e.g., at least one) of program modules that are configured to carry out the functions of embodiments of the invention.

Program/utility 340, having a set (at least one) of program modules 342, may be stored in memory 332 by way of example, and not limitation, as well as an operating system, one or more application programs, other program modules, and program data. Each of the operating system, one or more application programs, other program modules, and program data or some combination thereof, may include an implementation of a networking environment. Program modules 342 generally carry out the functions and/or methodologies of embodiments of the invention as described herein.

Computing system 312 may also communicate with one or more external devices 314 such as a keyboard, a pointing device, a display 324, etc.; one or more devices that enable a user to interact with computing system 312; and/or any devices (e.g., network card, modem, etc.) that enable computing system 312 to communicate with one or more other computing devices. Such communication can occur via Input/Output (I/O) interfaces 322. Computing system 312 can communicate with one or more networks such as a local area network (LAN), a general wide area network (WAN), and/or a public network (e.g., the Internet) via network adapter 320. As depicted, network adapter 320 communicates with the other components of computing system, 312, via bus 318. It should be understood that, although not shown, other hardware and/or software components could be used in conjunction with computing system 312. Examples include, but are not limited to: microcode, device drivers, redundant processing units, external disk drive arrays, RAID systems, tape drives, and data archival storage systems, etc.

The methods may be implemented using a computer program product. The computer program product may include a computer readable storage medium (or media) having computer readable program instructions thereon for causing a processor to carry out aspects of the method.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry.

Aspects are described herein with reference to flowchart illustrations and/or block diagrams of methods. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGS. illustrate the architecture, functionality, and operation of possible implementations of systems, methods, and computer program products. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for processing a formal specification of a digital circuit, the formal specification comprising information about a signal path for forwarding a digital signal from a source to a sink, the method comprising:
   inputting the formal specification;
   identifying at least one signal group and at least one signal path belonging to the signal group based on the formal specification;
   inputting physical design constraints;
   calculating, based on the physical design constraints and the at least one signal group, a number of clocked stages to be inserted into the signal path, such that the signal paths of a certain signal group have the same calculated number of clocked stages; and
   calculating pre-positions of the clocked stages having equal distance.

2. The method according to claim 1, further comprising:
   identifying a minimum number of clocked stages of a signal group from the formal specification, wherein the calculated number of clocked stages is greater than or equal to the minimum number.

3. The method according to claim 1, further comprising:
   identifying a maximum number of clocked stages of a signal group from the formal specification, wherein the calculated number of clocked stages is less than or equal to the maximum number.

4. The method according to claim 1, wherein the formal specification includes a hardware description language file and at least one of the following is identified based on analyzing an attribute contained in the hardware description language file: the at least one signal group, a minimum number of clocked stages, or a maximum number of clocked stages, or a combination thereof.

5. The method according to claim 1, wherein the physical design constraints comprise at least one of: restrictions of uselayers allowed for routing the signal path, restriction on a wirecode allowed for routing the signal path, or floor planning data specifying at least one region where a restriction related to the uselayer or the wirecode applies, or a combination thereof.

6. The method according to claim 1, wherein the clocked stage comprises at least one of a latch, a pulsed latch or a register.

7. A computer program product comprising a computer readable storage medium having computer readable program code embodied therewith, the computer readable program code being executable by a processor to perform a method comprising:
   inputting the formal specification;
   identifying at least one signal group and at least one signal path belonging to the signal group based on the formal specification;
   inputting physical design constraints;
   calculating, based on the physical design constraints and the at least one signal group, a number of clocked stages to be inserted into the signal path, such that the signal paths of a certain signal group have the same calculated number of clocked stages; and
   calculating pre-positions of the clocked stages having equal distance.

8. The computer program product according to claim 7, wherein the method further comprises:
   identifying a minimum number of clocked stages of a signal group from the formal specification, wherein the calculated number of clocked stages is greater than or equal to the minimum number.

9. The computer program product according to claim 7, wherein the method further comprises:
   identifying a maximum number of clocked stages of a signal group from the formal specification, wherein the calculated number of clocked stages is less than or equal to the maximum number.

10. The computer program product according to claim 7, wherein the formal specification includes a hardware description language file and at least one of the following is identified based on analyzing an attribute contained in the hardware description language file: the at least one signal group, a minimum number of clocked stages, or a maximum number of clocked stages, or both.

11. The computer program product according to claim 7, wherein the physical design constraints comprise at least one of: restrictions of uselayers allowed for routing the signal path, restriction on a wirecode allowed for routing the signal path, or floor planning data specifying at least one region where a restriction related to the uselayer or the wirecode applies, or a combination thereof.

12. The computer program product according to claim 7, wherein the method further comprises:
   re-calculating the position of the clocked stage nearest to the source and/or re-calculating the position of the clocked stage nearest to the sink based on floorplanning data.

13. The computer program product according to claim 7, wherein the clocked stage comprises at least one of a latch, a pulsed latch or a register.

14. A system for processing a formal specification of a digital circuit, the specification comprising information about a signal path for forwarding a digital signal from a source to a sink, the system comprising:
   a memory; and
   a processor communicatively coupled to the memory, wherein the system performs a method comprising:
      inputting the formal specification;
      identifying at least one signal group and at least one signal path belonging to the signal group based on the formal specification;
      inputting physical design constraints;
      calculating, based on the physical design constraints and the at least one signal group, a number of clocked stages to be inserted into the signal path, such that the signal paths of a certain signal group have the same calculated number of clocked stages; and
      calculating pre-positions of the clocked stages having equal distance.

15. The system according to claim 14, wherein the method further comprises:
   identifying a minimum number of clocked stages of a signal group from the formal specification, wherein the calculated number of clocked stages is greater than or equal to the minimum number.

16. The system according to claim 14, wherein the method further comprises:
   identifying a maximum number of clocked stages of a signal group from the formal specification, wherein the calculated number of clocked stages is less than or equal to the maximum number.

17. The system according to claim 14, wherein the formal specification includes a hardware description language file and at least one of the following is identified based on analyzing an attribute contained in the hardware description language file: the at least one signal group, a minimum number of clocked stages, or a maximum number of clocked stages, or a combination thereof.

\* \* \* \* \*